United States Patent
Gillooly et al.

(10) Patent No.: US 6,810,430 B1
(45) Date of Patent: Oct. 26, 2004

(54) NETWORK COMMUNICATIONS COUPLER

(75) Inventors: Gregory Bruce Gillooly, Cleveland Heights, OH (US); David Waters, Willoughby, OH (US); Cheng-Yang Chou, Concord Township, OH (US); Peter Lui, Mentor, OH (US); Samuel A. Mattoni, Jr., Twinsburg, OH (US); Edward S. Mallinak, Russell, OH (US); Eric Robertson, Russell Township, OH (US); Charles J. Stack, Westlake, OH (US)

(73) Assignee: ABB Automation Inc., Wickliffe, OH (US)

( * ) Notice: Subject to any disclaimer, the term of this patent is extended or adjusted under 35 U.S.C. 154(b) by 575 days.

(21) Appl. No.: 09/676,075

(22) Filed: Sep. 29, 2000

(51) Int. Cl.[7] .............................................. G06F 15/16
(52) U.S. Cl. ..................... 709/249; 709/215; 709/203; 709/226; 709/229; 709/233; 707/103; 370/401; 379/297; 385/49
(58) Field of Search ................................ 709/203, 215, 709/226, 229, 233, 249; 707/103; 385/49; 370/401; 379/297

(56) References Cited

U.S. PATENT DOCUMENTS

| | | | | |
|---|---|---|---|---|
| 5,606,705 A | * | 2/1997 | Randall et al. | ............. 709/203 |
| 5,915,054 A | * | 6/1999 | Ota | ............................. 385/46 |
| 5,996,017 A | * | 11/1999 | Cipiere | ....................... 709/229 |
| 6,052,461 A | * | 4/2000 | Lam | ........................... 379/207 |
| 6,115,384 A | * | 9/2000 | Parzych | ...................... 370/401 |
| 6,233,622 B1 | * | 5/2001 | Atsatt et al. | ................ 709/315 |
| 6,336,135 B1 | * | 1/2002 | Niblett et al. | ............... 709/215 |
| 6,360,262 B1 | * | 3/2002 | Guenthner et al. | ......... 709/226 |
| 6,418,474 B1 | * | 7/2002 | Morris | ....................... 709/233 |

* cited by examiner

Primary Examiner—Hosain Alam
Assistant Examiner—Liang-che Wang
(74) Attorney, Agent, or Firm—Michael M. Rickin, Esq.

(57) ABSTRACT

A coupler for connecting a first communications network to a second communications network. The coupler implements its functionality in software.

14 Claims, 5 Drawing Sheets

Figure 1: Typical Coupler Implementation

NETWORK COMMUNICATIONS COUPLER

FIELD OF THE INVENTION

This invention relates to network communications couplers and more particularly to a coupler that performs its functionality in software.

DESCRIPTION OF THE PRIOR ART

A coupler is a communications device that maps data structures and operational behaviors between two dissimilar communication environments. In other words, a communications coupler interconnects a first network that uses a first protocol to a second network that uses a second protocol.

Figure 1:
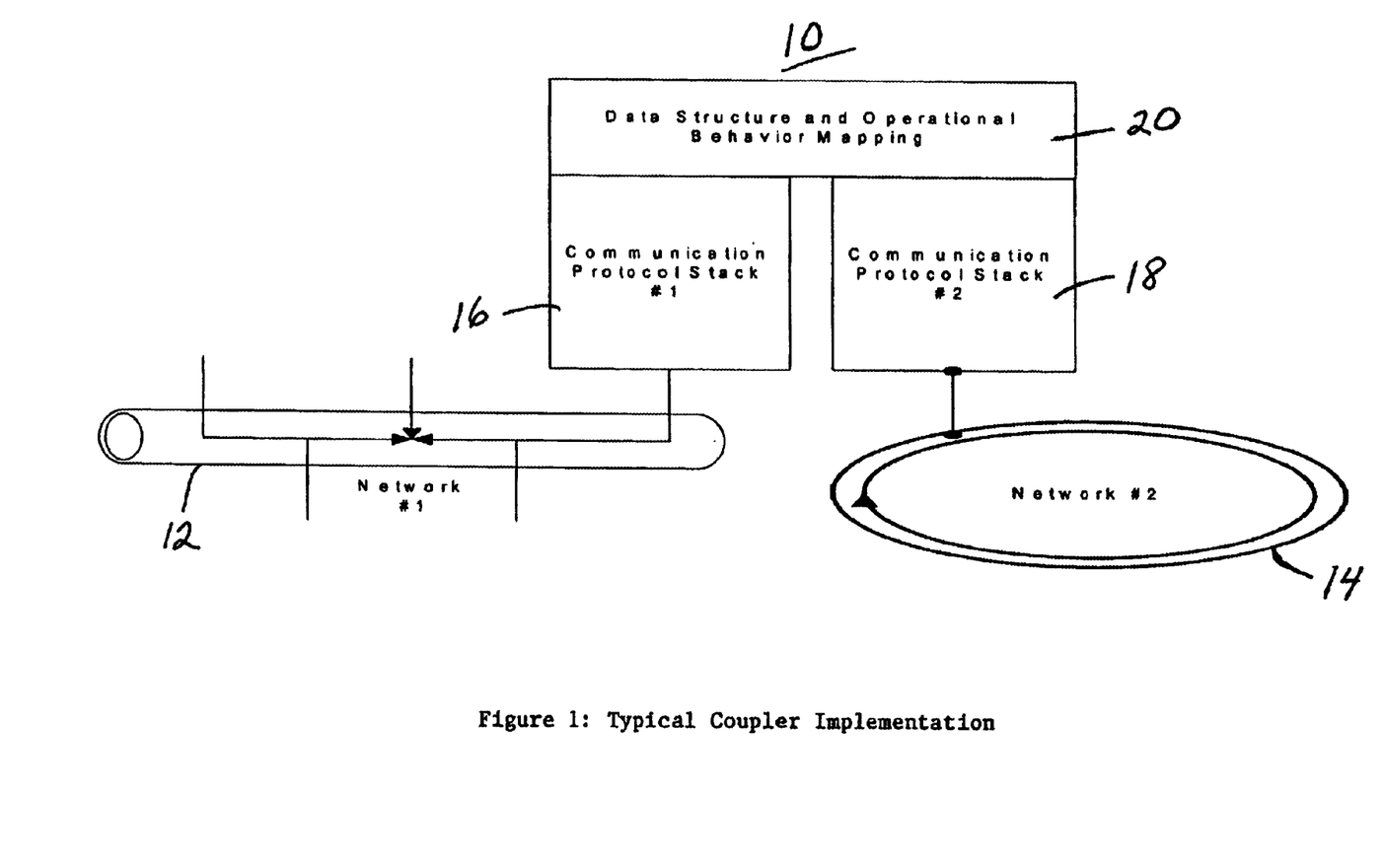
FIG. 1 shows a typical implementation for a network communications coupler.

The basic structure of a typical communication coupler is well known to those of ordinary skill in the art and is shown in FIG. 1. Coupler 10 interconnects a first network 12 with a second network 14 and includes three software implemented functions in performing that interconnection. Two of these functions are a first communication protocol stack 16 and a second communication protocol stack 18. Stacks 16 and 18 provide the interface of the coupler 10 with the first and second networks 12 and 14, respectively.

The coupler 10 further includes a mapping program 20 that maps the protocols of the first and second networks 12 and 14 to each other. While not shown in FIG. 1, it is well known to those in the art that coupler 10 has to run on a suitable hardware platform and include suitably arranged circuit boards to connect the first protocol stack 16 to the first network 12 and the second protocol stack 18 to the second network 14.

One embodiment of a prior art communications coupler is the coupler sold by the assignee of the present invention that is used to interconnect the assignee's distributed process control systems (DCS) to the Ethernet.

That coupler has a multiplicity of components including a personal computer that runs a server program, hardware to interface with the communications network in the DCS, a network interface circuit, termination units, and a database engine for buffering for data and control information. This coupler while providing a very good interconnection between the DCS and the Ethernet does have a large footprint, consumes a fair amount of electrical power, requires multiple input power and cannot be adjacent to the process controlled by the DCS as the coupler is sensitive to environmental conditions.

In contrast thereto, the coupler of the present invention is an integrated solution that has a smaller footprint, uses less electrical power, has a single input power requirement, has a higher capacity and can be located adjacent to the process controlled by the DCS. Further the coupler of the present invention can be accessed externally using standard network protocol for maintenance purposes and allows for remote analysis of its performance.

SUMMARY OF THE INVENTION

The present invention is also a method for use with those of a plurality of commands sent by at least one client on a network connected to a network communications coupler designated by the at least one client as delayed response commands. The method comprises:

designating by the at least one client by means of a predetermined key value provided by said at least one client which of the commands are delayed response commands, said at least one client using said predetermined key value to retrieve a reply to said at least one delayed response command executed by said coupler;

storing in the coupler a first instance of a template, where the first instance is used to store in the coupler at least one of the delayed response commands during execution of the at least one delayed response command by the coupler; and storing in the coupler a second instance of said template, where the second instance is used to store in the coupler a reply to the at least one delayed response command executed by the coupler until the reply is retrieved by the client.

The present invention is also a system that comprises:

a first network having at least one client connected thereto;

a second network;

the first and second networks having different protocols;

a network communications coupler connected to both the first network and the second network;

the at least one client sending a plurality of commands to the coupler and designating at least one of the commands as a delayed response command;

the coupler for storing one or more instances of a command interpreter, the command interpreter providing a command/reply interface for data and command exchange between one of the at least one clients and the second network and the coupler also for storing a first instance of a template, the template associated with one or more instances of the command interpreter, the first instance used to store in the coupler at least one of the delayed response commands during execution of the at least one delayed response command by the coupler; and for storing a second instance of the template, the second instance used to store in the coupler a reply to the at least one delayed response command executed by the coupler until the reply is retrieved by the client.

The invention is further a system that comprises:

a first network having at least one client connected thereto;

a distributed control system comprising a second network;

the first and second networks having different protocols;

a network communications coupler connected to both the first network and the second network;

the at least one client sending a plurality of commands to the coupler and designating by means of a predetermined key value provided by the at least one client at least one of the plurality of commands as a delayed response command, the at least one client using the predetermined key value to retrieve a reply to the at least one delayed response command executed by the coupler;

the coupler for storing one or more instances of a command interpreter, the command interpreter providing a command/reply interface for data and command exchange between one of the at least one clients and the second network and the coupler also for storing a first instance of a template, the template associated with one or more instances of the command interpreter, the first instance used to store in the coupler at least one of the delayed response commands during execution of the at least one delayed response command by the coupler; and for storing a second instance of the template, the second instance used to store in the coupler a reply to the at least one delayed response command executed by the coupler until the reply is retrieved by the client.

The present invention is a method for use with those of a plurality of commands sent by at least one client on a network connected to a network communications coupler designated by the at least one client as delayed response commands. The method comprises:

storing in the coupler one or more instances of a command interpreter, the command interpreter providing a command/reply interface for data and command exchange between one of the at least one clients and a control network connected to the coupler;

storing in the coupler a first instance of a template, the template associated with one of the one or more stored instances of the command interpreter, the first instance used to store in the coupler at least one of the delayed response commands during execution of the at least one delayed response command by the coupler; and storing in the coupler a second instance of the template, the second instance used to store in the coupler a reply to the at least one delayed response command executed by the coupler until the reply is retrieved by the client.

DESCRIPTION OF THE PREFERRED EMBODIMENT(S)

Figure 2:
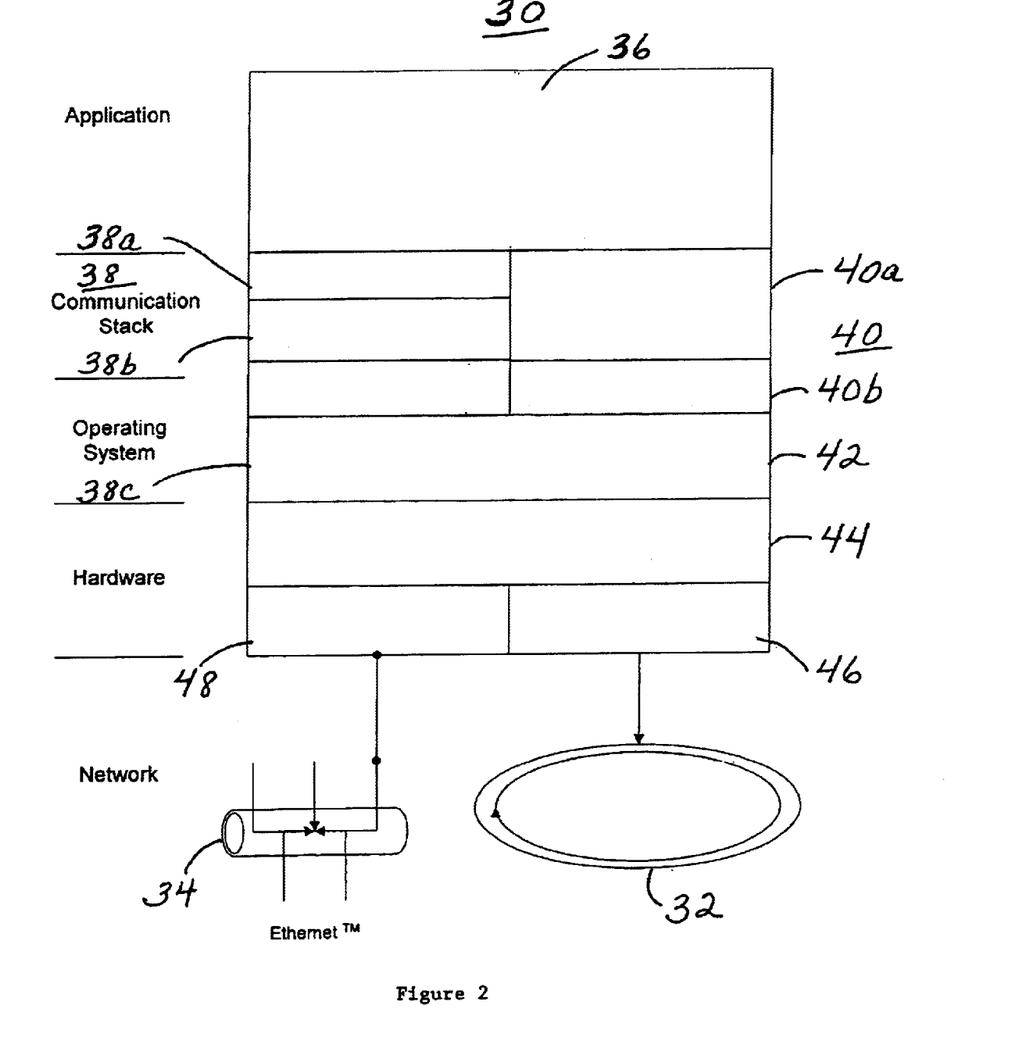
FIG. 2 shows a block diagram of the general architecture of the coupler of the present invention.

Referring now to FIG. 2, there is shown a block diagram of the general architecture of a communications coupler 30 embodied in accordance with the present invention. Coupler 30 is used in this embodiment to interconnect a proprietary communications network 32 of a DCS sold by the assignee of the present invention to a standard communication network 34 which in this one embodiment is the Ethernet network.

As is shown in FIG. 2, coupler 30 includes a mapping program 36 in the form of the server portion of a software program that functions to provide the protocol so that the coupler 30 can communicate with the proprietary hardware of the DCS in which coupler 30 is used. Coupler 30 further includes a first communication protocol stack 38 and a second communication protocol stack 40. First stack 38 includes first, second and third layers 38a, 38b and 38c respectively. Second layer 38b functions to interface with the operating system software 42 of coupler 30 and first layer 38a provides the interface between mapping program 36 and second layer 38b. Third layer 38c provides the drivers for the Ethernet.

Second stack 40 includes a first layer 40a and a second layer 40b. First layer 40a provides the interface between the mapping program 36 and the second layer 40b. Second layer 40b provides the control network interface between first layer 40a and the operating system software 42. A detailed description of layer 40b is given below in connection with FIG. 3.

Coupler 30 also includes a suitable hardware platform 44 which includes a digital processor and the circuits 46 and 48 to interface the coupler 30 with communication networks 32 and 34, respectively. In one embodiment for coupler 30, operating system software 42 is the VxWorks software available from Wind River Systems, Inc. of Alameda, Calif.

Figure 3:
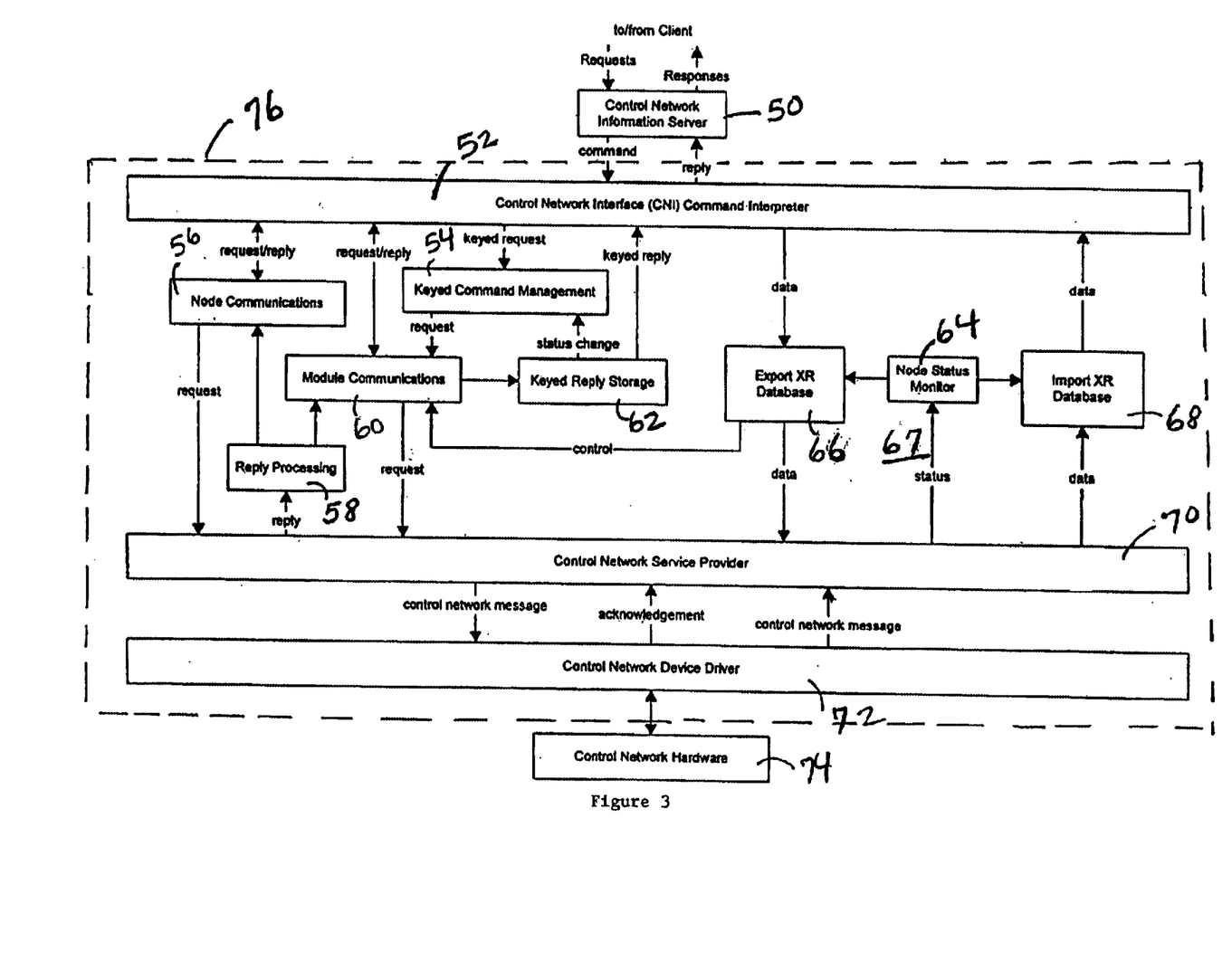
FIG. 3 shows a block diagram of one of the layers of FIG. 2.

Referring now to FIG. 3 there is shown a block diagram of the second layer 40b of second stack 40 of FIG. 2. Layer 40b communicates with standard communications network 34 based-clients through control network information server 50. Server 50 represents the combination of mapping program 36, first stacks 38, first layer 40a and interface 48 of FIG. 2 and is an application that presents to the communications network 34 based clients a means by which control network 32 information may be exchanged between the clients and control network 32 resident entities. The control network information server 50 provides an information access service to the communications network 34 of FIG. 2.

The control network information server 50 communicates by commands and responses with a control network interface (CNI) command interpreter 52. The CNI Command Interpreter 52 provides the command/reply interface for data and command exchange between the software components of the control network interface (CNI) 76, which is essentially the second layer 40b of FIG. 2 and the client application. As is shown in FIG. 3 CNI 76 includes CNI command interpreter 52, control network device driver 72 and all of the blocks between interpreter 52 and driver 72.

The command/reply interface allows a client application to establish channels of communication to locations in the underlying control network. These locations may be individual data points or individual nodes or modules within the process control system. The CNI Command Interpreter 52 is responsible for recognizing the commands and requests, reformatting them as necessary and forwarding them to the appropriate subsystem component for processing. The CNI Command Interpreter 52 is also responsible for retrieving the requested information, formatting a proper reply to the client application and delivering it to the client on request.

The client may specify that it prefers a delayed (non blocking) response for certain commands sent by the sender which commands are known as keyed commands. The keyed command management component 54 manages the execution of keyed commands and their replies. The processing of the keyed commands is begun at the request of the client and when such processing is requested a keyed request is sent from the control network interface command interpreter 52 to the keyed command management component 54. A special reply which indicates that the command processing has started is supplied to the client by CNI Command Interpreter 52. During the command processing the client may proceed with other work. When the processing of the command is completed a reply to the client is generated that is stored in keyed reply storage 62, which manages the storage and retrieval of replies to keyed commands. The reply may be retrieved from by the client at the convenience of the client.

CNI command interpreter 52 also interfaces with node communications 56 which communicates through control network service provider 70, control network device driver 72 and control network hardware 74 with nodes in the remote control network to gather diagnostic or status information. Control network service provider 70 embodies the control network protocol. Control network device driver 72 provides the drivers that allows second layer 40b to communicate with the control network hardware 74. Control network hardware 74 implements the connection to the control network and thus provides the function of control network card 46.

As was described above, control network service provider 70 has the control network protocol and provides a convenient way to communicate with control network resident nodes.

Control network service provider 70 formats and sends control network messages, waits for replies and acknowledgements and supplies delivery confirmations, reply messages and message arrival notifications to the CNI 76. These reply messages are received by reply processing 58 which matches reply messages from the control network service provider 70 with outstanding requests from within the CNI 76. Reply processing 58 sends the received message to the requester for further processing.

As was described above, control network device driver 72 provides the drivers that allows second layer 40b to communicate with the control network hardware 74 and thus offers a convenient way to communicate with the control network hardware. Control network device driver 72 initializes the control network hardware 74 and responds to interrupts from that hardware, buffers incoming and outgoing messages, and supplies a keep-alive handshake service to the control network hardware 74.

The remote control network includes various plug in circuit boards known as modules which are used in the control of the process. Module communications 60 communicates through control network service provider 70, control network device driver 72 and control network hardware 74 with those remote control network modules for the exchange of status, data and control information.

Nodes of the remote control network may change their status. For example, a node status may change to offline, online or busy. CNI 76 maintains records of the node status. These records are updated by node status monitor 64 which also notifies the export and import components 66 and 68, respectively, of the exception report (XR) database 67 of these changes.

The export XR database 66 holds current value, quality, status and timestamp for exception report points which are being sent from a Client (or the CNI itself) to the control network. Export XR database 66 maintains the connections between outgoing exception report points and control network-resident destinations. Import XR database 68 holds current value, quality, status and timestamp for exception report points which are being received from the control network for reporting to a Client. Import XR database 68 maintains the connections between incoming exception report points and control network-resident sources.

A more detailed description of several of the blocks described above is given below. For the convenience of the reader each block or blocks is described in a section that carries an appropriate heading.

The XR Database 67

As was described above, the XR database 67 in the form of the Export XR and Import XR components 66, 68 stores data received from sources on one of the two networks 34, 36 and supplies it in a suitable form to requestors on the other of the two network 34, 36. Since the requesters may require the data in a different form than it is received from the source, the XR database 67 also provides the data translation methods.

Figure 4:
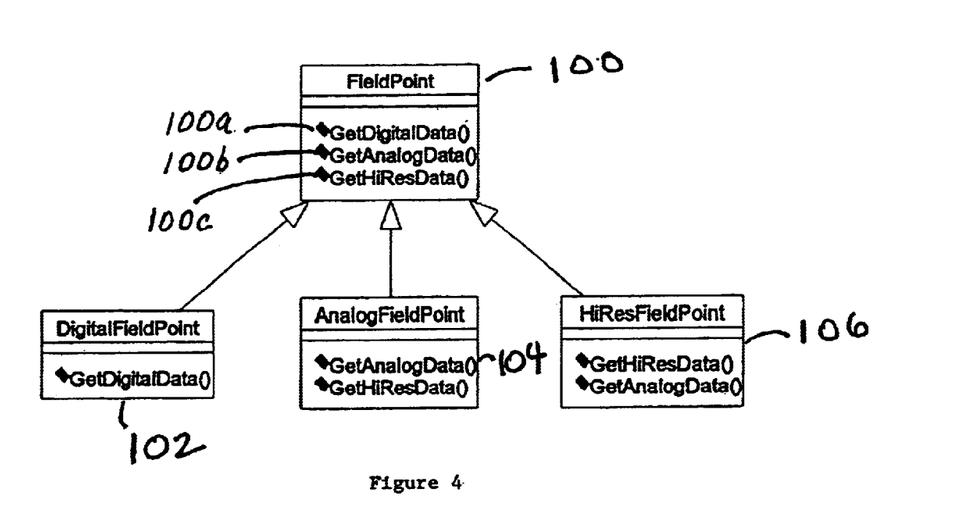
FIG. 4 shows class FieldPoint and three examples of classes derived from that class.

To perform this function the XR database 67 represents each data source with an instance of the class named FieldPoint or a class derived from FieldPoint. A class derived from another class is also known as a subclass.

FIG. 4 shows the class FieldPoint 100 and three examples of classes 102, 104 and 106 derived from that class. The derived classes 102, 104 and 106 are named DigitalFieldPoint, AnalogFieldPoint, and HiResFieldPoint, respectively. The three derived classes 102, 104 and 106 are used to represent particular kinds of data sources. Each of the derived classes 102, 104 and 106 stores the most current value of the data from the network source 34 or 36.

Three examples of data access methods are shown in the FieldPoint class 100: GetDigitalData( ) 100a, GetAnalogData( ) 10b, and GetHiResData( ) 100c, corresponding to the three types of data represented by the three derived classes 102, 104, 106. These data access methods 100a, 100b and 100c provide the data from the source in the specified form, translating it if needed. The methods 100a, 100b and 100c are virtual methods, intended to be overridden in the derived classes 102, 104, 106.

Each subclass 102, 104, 106 provides (overrides) only the data access methods 100a, 10b, 100c appropriate to the data type it represents. Thus the DigitalFieldPoint class 102 has only the GetDigitalData( ) method 100a, while the AnalogFieldPoint and HiResFieldPoint classes 104, 106 have both the GetAnalogData( ) and GetHiResData( ) methods 10b, 100c, respectively.

Therefore it is possible to translate between the Analog and HiRes data formats, but not between the Digital format and either the Analog or HiRes formats. If a derived class 102, 104, 106 does not provide a particular method 100a, 100b and 100c, the base class FieldPoint 100 provides a version that may return an error status or other indication of a failed data access.

Figure 5:
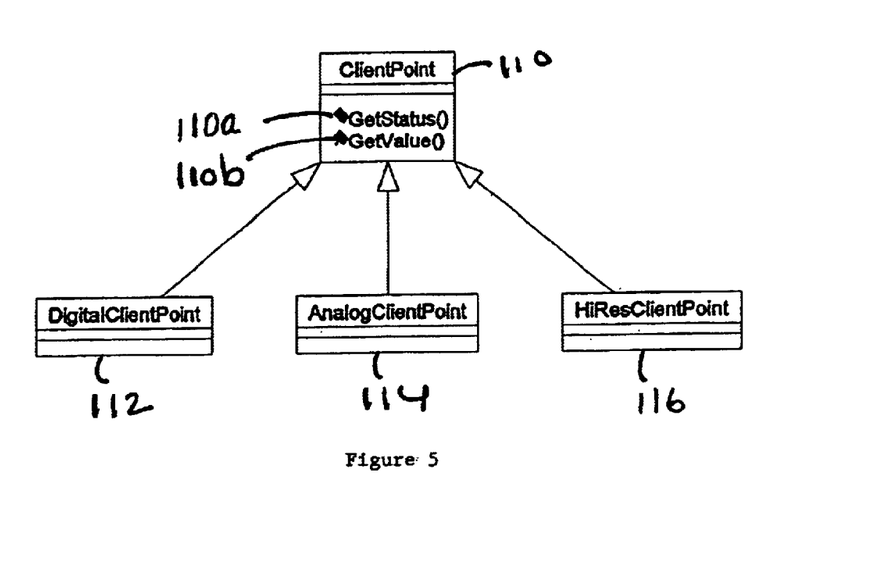
FIG. 5 shows class ClientPoint and three examples of classes derived from that class.

To get information from the other network, a client on one network creates an instance of a class named ClientPoint or a class derived from class ClientPoint. FIG. 5 shows class ClientPoint 110 and three examples of classes 112, 114 and 116 derived from that class. The derived classes 112, 114 and 116 are DigitalClientPoint, AnalogClientPoint, and HiResClientPoint, respectively. As in the FieldPoint classes, the three derived classes 112, 114 and 116 are used to represent particular kinds of data sources.

Class ClientPoint 110 and its three derived classes 112, 114 and 116 provide the access methods GetStatus( ) 110a and GetValue( ) 10b, for example, to retrieve information from or about the data source.

Figure 6:
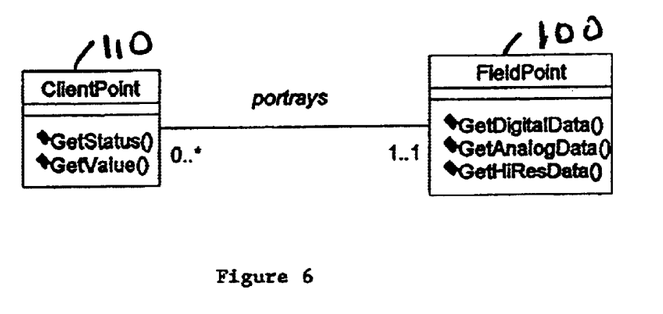
FIG. 6 shows an instance of class ClientPoint that is associated with an instance of class FieldPoint.
Figure 7:
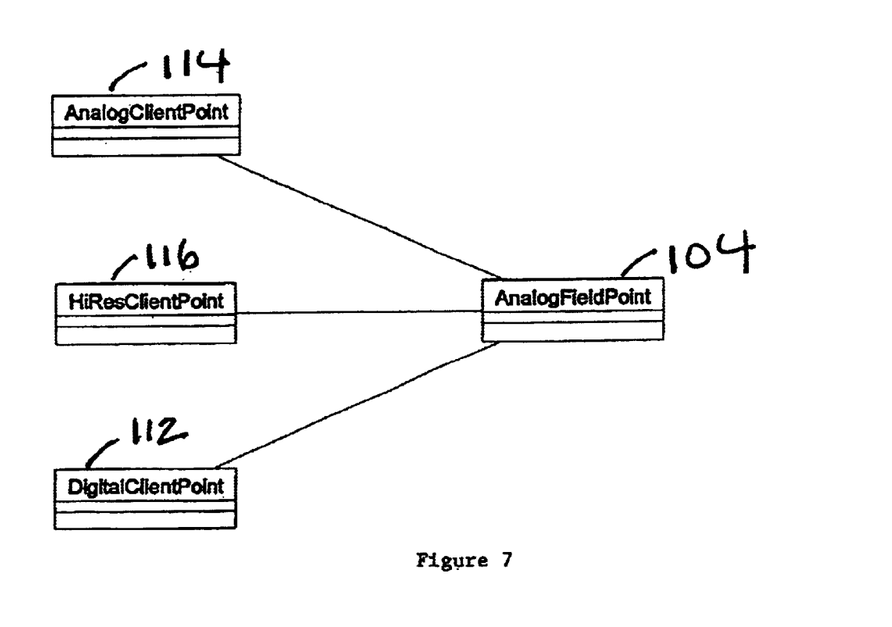
FIG. 7 shows an example where various classes use the data of an associated access method of class FieldPoint.

The instance of class ClientPoint 110 created by the client is associated with an instance of class FieldPoint 100 representing the desired data source, as shown in FIG. 6. The association is identified in FIG. 6 as "portrays", as the instance of class ClientPoint 110 portrays the instance of class FieldPoint 100 for the client in a suitable form. Each ClientPoint is associated with one and only one FieldPoint, while each FieldPoint may have an association with zero, one, or more ClientPoints. FIG. 7 shows an example with one AnalogFieldPoint 104 associated with an AnalogClientPoint 114, a HiResClientPoint 116, and a DigitalClientPoint 112.

To retrieve information, a client uses, for example, the GetValue( ) methods 110b of the particular ClientPoint 110. The ClientPoint 110 then uses the particular FieldPoint 100 data access method 102, 104, 106 appropriate for its own data type to get the data from the FieldPoint 100.

In the example shown in FIG. 7, the AnalogFieldPoint 104 is able to provide the data in the correct form to the AnalogClientPoint 114 and HiResClientPoint 116, but not to the DigitalClientPoint 112, as the AnalogFieldPoint 104 does not support the GetDigitalData( ) method 100a. Since the GetDigitalData( ) method 100a is not supported by the AnalogFieldPoint class 104, to provide the data in correct form to the DigitalClientPoint 112, the base class FieldPoint 100 provides the default GetDigitalData( ) method 100a that supplies the error indication.

In the example shown in FIG. 7, the AnalogFieldPoint 104 is able to provide the data in the correct form to the AnalogClientPoint 114 and HiResClientPoint 116, but not to the DigitalClientPoint 112, as the AnalogFieldPoint 104 does not support the GetDigitalData( ) method 100a. Since the GetDigitalData( ) method 100a is not supported by the AnalogFieldPoint class 104, to provide the date to in correct form to the DigitalClientPoint 112, the base class FieldPoint 100 provides the default GetDigitalData( ) method 100a that supplies the error indication.

CNI 76

The CNI 76 is an object-oriented implementation. It presents to the control network information server 50 a command/reply interface equivalent to the command/reply interface of the prior art coupler sold by the assignee of the present invention, but offers it by way of a direct function call rather than some external interface thereby increasing efficiency and performance.

```
// interface class
class CNI:public ClientInterface
{
public:
    CNI ( );
    ~CNI ( );
    int processCommand( char * CommandText, int CommandTextSize );
    int getReply( char * ReplyDestination, int MaxReplySize );
};
```

The CNI class provides a means by which a Client Application may access the functionality in the CNI through a familiar interface. The interface uses a simple command/reply protocol, where a command is issued and then a reply is retrieved.

In the prior art coupler mentioned above this command was formatted in a buffer which then was sent through the "send" side of a physical interface such as a RS232 serial or SCSI port. The reply then arrives on the "receive" side of the physical interface when processing is completed by the device that received the sent command. The receive side has no control over when the device generates its reply.

This simple command/reply protocol presentation has three benefits as follows:

a. The command is executed directly by invoking the processCommand method of a CNI object The Client Application instantiates a CNI object, constructs a command string and invokes the CNI processCommand method, passing in the command string. When the method returns, processing is complete. This is distinct from the prior art coupler mentioned above in that the Client Application in that coupler has to manage a hardware connection and tolerate all of its vagaries, as well as having no indication of the completion of command processing.

b. The reply is retrieved by the Client action of invoking the getReply method of the CNI object The Client Application is informed of the completion of command execution by the returning of control from the CNI processCommand method. This also indicates a reply is ready for retrieval. The Client Application may at its own discretion retrieve the reply from the CNI that executed the command simply by invoking its getReply method, supplying as an argument a memory location to which the reply should be copied. This is distinct from the prior art coupler mentioned above in that the Client Application of that coupler has to manage a hardware connection and tolerate all of its vagaries, as well as having to accept the asynchronous arrival of a reply.

c. There may be more than one CNI object present simultaneously in the system The CNI object implements an interface to the CNI 76. Unlike the prior art mentioned above, multiple CNI objects may be instantiated and function simultaneously.

The individual command handlers are implemented as objects derived from a common base class that encapsulates the command handling behaviors that are common to all commands, as well as support for asynchronous completion of command execution as required by the keyed commands.

Keyed Command Management 54 and Keyed Reply Storage 62

As was described above, the client may specify that it prefers a delayed (non blocking) response for certain commands sent by the client which commands are known as keyed commands. The keyed command management component 54 manages the execution of keyed commands and their replies. When the processing of the keyed command is completed a reply to the client is generated that is stored in keyed reply storage 62, which manages the storage and retrieval of replies to keyed commands.

Keyed command management 54 includes a template, known as the keyed storage template which is shown below, for the storage and management of heap-resident objects where pointers to individual objects are stored and retrieved using a "key" or index value provided by the user, which in this embodiment is the client. The key or index value specified by the user is used for designating and retrieving a reply thereby allowing the user to match the reply with the keyed command.

Methods are provided for putting objects, getting objects and checking to see if an object is present under a certain "key". Storing of pointers eliminates copying. A user-supplied key provides an additional degree of control to the user (e.g. the user can reserve certain keys for particular uses).

The keyed storage template consists of a template declaration having one template parameter class (Entry) in the template parameter list and several statements defining the template.

Members comprise a pointer of type Entry, enumerated special values for designating boundary and special conditions, and several methods.

Methods comprise constructor, destructor and access methods. The constructor and destructor methods serve the usual purposes. One access method takes arguments of key and Entry and has the purpose of placing the Entry into keyed storage associating it with the given key. One access method takes a single argument of a key and has the purpose of returning the corresponding Entry after performing a destructive read that removes the Entry from storage. One access method takes a single argument of a key and has the purpose of returning the corresponding entry without performing a destructive read, thus leaving the corresponding Entry in storage.

Specializations of this template are used in keyed command management 54 and keyed reply storage 62. The specialization of the keyed storage template used in keyed command management 54 stores delayed response commands while they are being executed, associating the command with the key value supplied by the client. When the command has completed execution, the specialization of the keyed storage template used in keyed reply storage 62 stores the corresponding reply to the delayed response command, associating the reply with the key value supplied by the client. The client specifies this key again when requesting retrieval of the reply.

```
//
// KeyedStorage Implementation
//
template <class Entry>
KeyedStorage<Entry>::KeyedStorage( )
{
    storage = new Entry [1+MAXKEYVAL];
    for( int i = 0; i <= MAXKEYVAL; i++)
    {
        storage[i] = NULL;
    }
};
template <class Entry>
KeyedStorage<Entry>::~KeyedStorage( )
{
    delete[ ] storage;
};
template <class Entry> int KeyedStorage<Entry>::putEntry(
int key, Entry newEntry )
{
    int success;
    if( key >=0 && key <= MAXKEYVAL )
    {
        storage[key] = newEntry;
        success = TRUE;
    }
    else
    {
        success = FALSE;
    }
    return( success );
};
template <class Entry> Entry
KeyedStorage<Entry>::getEntry( int key )
{
    Entry foundEntry;
    if( key >= 0 && key <= MAXKEYVAL )
    {
        foundEntry = storage[key];
        storage[key] = NULL;
    }
    else
    {
        foundEntry = NULL;
    }
    return( foundEntry );
} ;
template <class Entry> Entry
KeyedStorage<Entry>::checkEntry( int key )
{
    Entry foundEntry;
    if( key >= 0 && key <= MAXKEYVAL )
    {
        foundEntry = storage[key];
    }
    else
    {
        foundEntry = NULL;
    }
    return( foundEntry );
};
int KSTest(void )
{
    KeyedStorage<CNIReply *> ReplyStorage;
    KeyedStorage<CNICommand *> ActiveCommands;
    KeyedStorage<ClientInterface *> ClientInterfaces;
    CNIReply * Reply1 = (CNIReply *)1;
    CNIReply * Reply2 = (CNIReply *)2;
    CNICommand *Command1 = (CNICommand *)101;
    CNICommand *Command2 = (CNICommand *)102;
    ClientInterface *Client1 = (ClientInterface *)1001;
    ClientInterface *Client2 = (ClientInterface *)1002;
    ReplyStorage.putEntry( 1, Reply1 );
    ActiveCommands.putEntry( 1, Command1 );
    ClientInterfaces.putEntry( 1, Client1 );
    ReplyStorage.putEntry( 2, Reply2 );
    ActiveCommands.putEntry( 2, Command2 );
    ClientInterfaces.putEntry( 2, Client2 );
    printf("\n\ralles put\n\r");
    printf("\n\rchecking first reply = %p",
    ReplyStorage.checkEntry( 1 ) );
        printf("\n\rchecking second reply = %p",
    ReplyStorage.checkEntry( 2 ) );
        printf("\n\rchecking first command = %p",
    ActiveCommands.checkEntry( 1 ) );
        printf("\n\rchecking second command = %p",
    ActiveCommands.checkEntry( 2 ) );
        printf("\n\rchecking first client = %p",
    ClientInterfaces.checkEntry( 1 ) );
        printf("\n\rchecking second client = %p",
    ClientInterfaces.checkEntry( 2 ) );
        printf("\n\rgetting first reply = %p",
    ReplyStorage.getEntry( 1 ) );
        printf("\n\rgetting first reply again = %p",
    ReplyStorage.getEntry( 1 ) );
        printf("\n\rgetting second command = %p",
    ActiveCommands.getEntry( 2 ) );
        printf("\n\rgetting second command again = %p",
    ActiveCommands.getEntry( 2 ) );
        printf("\n\rgetting first client = %p",
    ClientInterfaces.getEntry( 1 ) );
        printf("\n\rgetting first client again = %p",
    ClientInterfaces.getEntry( 1 ) );
        printf("\n\r");
        return 0;
}
```

As those of ordinary skill in the art can appreciate the keyed storage template is a software mechanism for the storage of pointers to a finite number of like software objects by association with a user-supplied key value, which mechanism has the following features:
- Maximizes speed of access by storing pointers rather than copying entire objects
- Minimizes system memory usage by storing pointers rather than entire objects
- putEntry( ) Stores pointer to object, associating it with user-supplied key value
- getEntry( ) Permits removal of an arbitrary pointer by specification of key value (destructive read)
- checkEntry( ) Permits retrieval of an arbitrary pointer by specification of key value (non-destructive read)

The template allows coupler 30 to support the storage and retrieval of replies to "keyed commands" and the management of command execution, including support of a "cancel" operation removing the reply from storage.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A system comprising:
a first network having at least one client connected thereto;

a second network;

said first and second networks having different protocols;

a network communications coupler connected to both said first network and said second network;

said at least one client sending a plurality of commands to said coupler and designating at least one of said plurality of commands as a delayed response command;

said coupler for storing one or more instances of a command interpreter, said command interpreter providing a command/reply interface for data and command exchange between one of said at least one clients and said second network and said coupler also for storing a first instance of a template, said template associated with one or more instances of said command interpreter, said first instance used to store in said coupler at least one of said delayed response commands during execution of said at least one delayed response command by said coupler; and for storing a second instance of said template, said second instance used to store in said coupler a reply to said at least one delayed response command executed by said coupler until said reply is retrieved by said client.

2. The system of claim 1 further comprising a distributed control system connected to said second network.

3. The system of claim 1 wherein said at least one client designates by means of a predetermined key provided by said at least one client which of said plurality of commands sent to said coupler are said delayed response commands, said at least one client using said predetermined key value to retrieve a reply to said at least one delayed response command executed by said coupler.

4. A system comprising:

a first network having at least one client connected thereto;

a distributed control system comprising a second network;

said first and second networks having different protocols;

a network communications coupler connected to both said first network and said second network;

said at least one client sending a plurality of commands to said coupler and designating by means of a predetermined key value provided by said at least one client at least one of said plurality of commands as a delayed response command, said at least one client using said predetermined key value to retrieve a reply to said at least one delayed response command executed by said coupler;

said coupler for storing one or more instances of a command interpreter, said command interpreter providing a command/reply interface for data and command exchange between one of said at least one clients and said second network and said coupler also for storing a first instance of a template, said template associated with one or more instances of said command interpreter, said first instance used to store in said coupler at least one of said delayed response commands during execution of said at least one delayed response command by said coupler; and for storing a second instance of said template, said second instance used to store in said coupler a reply to said at least one delayed response command executed by said coupler until said reply is retrieved by said client.

5. A method for use with those of a plurality of commands sent by at least one client on a network connected to a network communications coupler designated by said at least one client as delayed response commands comprising:

storing in said coupler one or more instances of a command interpreter, said command interpreter providing a command/reply interface for data and command exchange between one of said at least one clients and a control network connected to said coupler;

storing in said coupler a first instance of a template, said template associated with one of said one or more stored instances of said command interpreter, said first instance used to store in said coupler at least one of said delayed response commands during execution of said at least one delayed response command by said coupler; and storing in said coupler a second instance of said template, said second instance used to store in said coupler a reply to said at least one delayed response command executed by said coupler until said reply is retrieved by said client.

6. The method of claim 5 wherein said template has a declaration having one template parameter class in the parameter list of said template and one or more statements defining said template.

7. The method of claim 6 wherein said one or more statements defining said template include a pointer of said template parameter class.

8. The method of claim 7 wherein said one or more statements defining said template further include enumerated special values for designating boundary and special conditions and one or more methods.

9. The method of claim 8 wherein said one or more methods statements comprise constructor, destructor and access methods.

10. The method of claim 6 wherein said template comprises:

a putEntry function that stores a pointer to an object and associates said pointer with a key value supplied by said at least one client;

a getEntry function that permits removal of an arbitrary pointer by specification of a value that matches said key value supplied by said at least one client; and a checkEntry function that permits retrieval of said arbitrary pointer by specification of a value that matches said key value supplied by said at least one client.

11. The method of claim 5 further comprising defining for said template a declaration having one template parameter class in the parameter list of said template and one or more statements defining said template.

12. The method of claim 11 further comprising defining for said one or statements a pointer of said one template parameter class, enumerated special values for designating boundary and special conditions, and one or more methods.

13. The method of claim 12 further comprising defining for said one or statements that are method statements methods selected from constructor, destructor and access methods.

14. The method of claim 5 wherein said at least one client designates which of said plurality of commands are delayed response commands by means of a predetermined key value provided by said at least one client.

* * * * *